(12) United States Patent
Kim (10) Patent No.: US 10,038,400 B2
(45) Date of Patent: Jul. 31, 2018

(54) FLOATING STRUCTURES FOR FLOATING PHOTOVOLTAIC SYSTEM AND METHOD FOR CONNECTING FLOATING STRUCTURES

(71) Applicant: W SOLAR CO., LTD., Daejeon (KR)

(72) Inventor: Seung Seop Kim, Daejeon (KR)

(73) Assignee: W SOLAR CO., LTD., Daejeon (KR)

( * ) Notice: Subject to any disclaimer, the term of this patent is extended or adjusted under 35 U.S.C. 154(b) by 0 days.

(21) Appl. No.: 15/302,496

(22) PCT Filed: Apr. 9, 2015

(86) PCT No.: PCT/KR2015/003562
§ 371 (c)(1),
(2) Date: Oct. 7, 2016

(87) PCT Pub. No.: WO2015/156613
PCT Pub. Date: Oct. 15, 2015

(65) Prior Publication Data
US 2017/0033732 A1    Feb. 2, 2017

(30) Foreign Application Priority Data

Apr. 9, 2014   (KR) ......................... 10-2014-0042619
Apr. 9, 2015   (KR) ......................... 10-2015-0050100

(51) Int. Cl.
*B63B 35/44*   (2006.01)
*H02S 20/30*   (2014.01)
*B63B 21/50*   (2006.01)

(52) U.S. Cl.
CPC .............. *H02S 20/30* (2014.12); *B63B 21/50* (2013.01); *B63B 35/44* (2013.01); *B63B 2035/4453* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,786,795 | A | * 11/1988 | Kurashima | ................ F24J 2/38 126/573 |
| 2006/0090789 | A1 | * 5/2006 | Thompson | ............. F24J 2/5239 136/246 |

(Continued)

FOREIGN PATENT DOCUMENTS

| | | |
|---|---|---|
| JP | 2001-129589 A | 5/2001 |
| KR | 10-1032365 B1 | 5/2011 |
| KR | 10-2013-0009184 A | 1/2013 |

OTHER PUBLICATIONS

International Search Report for PCT/KR2015/003562 dated Jul. 23, 2015 from Korean Intellectual Property Office.

*Primary Examiner* — Kyle Armstrong
(74) *Attorney, Agent, or Firm* — Revolution IP, PLLC (57) ABSTRACT

Floating structures for a floating photovoltaic system fixed to fixing blocks or fixing means fixed to the bottom of water, each floating structure having one or a plurality of solar modules disposed thereon, the floating structures comprising: a plurality of ropes or a plurality of connection members having fixing hooks for connecting the floating structures with each other so as to restrain the movements of the floating structures; and connecting and fixing parts disposed below the surface of water under the floating structures in such a manner as to be connected to the ropes or the connection members having the fixing hooks, whereby the ropes or the connection members having the fixing hooks are located below the surface of water to restrain the movements of the floating structures.

6 Claims, 5 Drawing Sheets

(56) References Cited

U.S. PATENT DOCUMENTS

| | | | |
|---|---|---|---|
| 2008/0029148 A1* | 2/2008 | Thompson | F24J 2/5239 |
| | | | 136/244 |
| 2010/0307566 A1 | 12/2010 | Hinderling | |
| 2012/0279557 A1* | 11/2012 | Alwitt | F24J 2/5239 |
| | | | 136/251 |
| 2013/0101356 A1 | 4/2013 | Newcomer | |
| 2014/0345510 A1* | 11/2014 | Li | B63B 39/06 |
| | | | 114/126 |

* cited by examiner

FLOATING STRUCTURES FOR FLOATING PHOTOVOLTAIC SYSTEM AND METHOD FOR CONNECTING FLOATING STRUCTURES

CROSS REFERENCE TO PRIOR APPLICATIONS

This application is a National Stage Application of PCT International Patent Application No. PCT/KR2015/003562 filed on Apr. 9, 2015, under 35 U.S.C. § 371, which claims priority to Korean Patent Application Nos. 10-2014-0042619 filed on Apr. 9, 2014 and 10-2015-0050100 filed on Apr. 9, 2015, which are all hereby incorporated by reference in their entirety.

TECHNICAL FIELD

The present invention relates to floating structures for a floating photovoltaic system and a method for connecting floating structures with each other, and more particularly, to floating structures for a floating photovoltaic system and a method for connecting the floating structures with each other that are capable of being prevented from being moved through movement restraint means mounted on the lower end located under the surface of water.

BACKGROUND ART

Generally, a photovoltaic cell converts the energy of light emitted from the sun into electricity. The elementary unit for generating the electric power through photoelectric effects is called a cell, and a plurality of cells for generating the electric power through serial or parallel connection with each other is called a photovoltaic module. A photovoltaic plant (which is called 'photovoltaic system') is an assembly of structures each having the plurality of photovoltaic modules connected in serial or parallel relation with each other.

The photovoltaic system is generally disposed on the land, which needs high land purchase and civil engineering work costs, and further, the land for the photovoltaic system is formed by flattening low mountains, which causes surrounding environments to be undesirably destroyed. Moreover, the photovoltaic modules are heated by the heat generated from the land in summer seasons so that they are not effectively cooled, thereby lowering their power generation efficiency.

Figure 1:
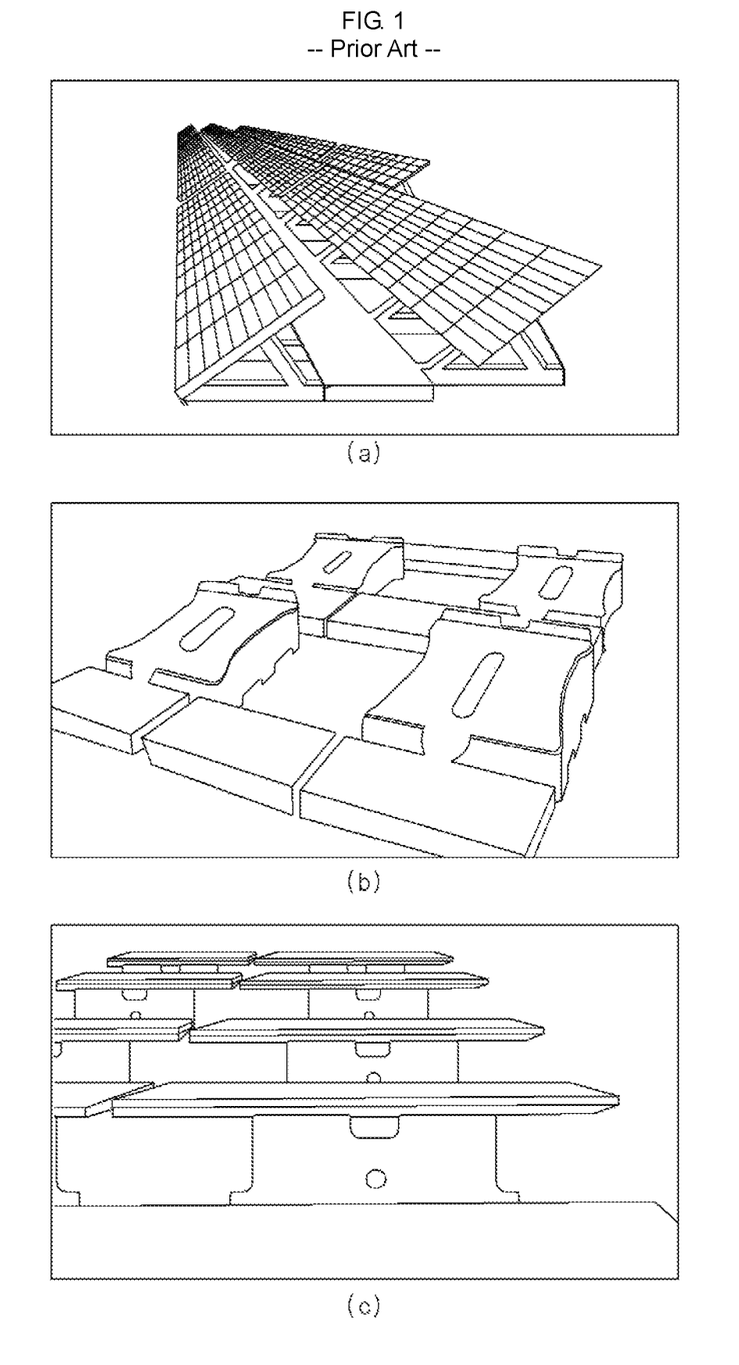
FIG. 1 is photographs showing conventional floating photovoltaic systems.

So as to solve the above-mentioned problems, there are proposed methods for installing the photovoltaic system on water such as lake, river, pond, dam and the like. Such floating photovoltaic system makes use of a plurality of floating structures disposed on the surface of water together with buoys, the floating structures having a plurality of photovoltaic modules arranged thereon. In the state wherein the floating structures for the floating photovoltaic system are floating on the surface of water, they do not have to be displaced over a set range from their installed position through the stream of water or external forces like wind, and further, they do not have to have any rotations like pitch, roll and yaw. If they are displaced on the surface of water or if they have the rotations like pitch, roll and yaw, the sun and the photovoltaic modules may be misaligned with respect to each other to lower the amount of power generated from the floating photovoltaic system, and otherwise, the photovoltaic modules may be broken by the collision with objects. FIG. 1 is photographs showing conventional floating photovoltaic systems.

Referring first to FIG. 1a, the conventional floating photovoltaic system is configured wherein front row structures and rear row structures are fixedly connected with each other by means of structure members, without any movements, and paths for a worker are formed between the front row structures and the rear row structures to conduct the maintenance of the floating photovoltaic system. In case of the conventional floating photovoltaic system as shown in FIG. 1a, however, the whole weight of the system become large, thereby increasing the construction cost thereof, and if the irregular bottom surface of a reservoir is exposed to the outside by drought, the conventional floating photovoltaic system may be broken due to its local load. In this configuration of the conventional floating photovoltaic system, ropes are connected to the outside portions of the wholly connected structures and tied up to anchors fixed to the bottom of the reservoir.

Other conventional floating photovoltaic systems are shown in FIGS. 1b and 1c, which are improvements of the conventional floating photovoltaic system of FIG. 1a. Referring now to FIGS. 1b and 1c, the conventional floating photovoltaic systems are configured wherein paths for a worker are formed between front and rear row structures on which photovoltaic modules are mounted so that the front row structures and the rear row structures are connected with each other in a hinge connection way at a height corresponding to the surface of water. In case of the conventional floating photovoltaic systems as shown in FIGS. 1b and 1c, if the irregular bottom surface of a reservoir is exposed to the outside by drought, the conventional floating photovoltaic systems may be not broken well due to their local load, but if wind blows, they may have rotations like pitch, roll and yaw. When the worker moves along the paths, further, he or she is likely to lose his or her balance on the paths, thereby making it hard to conduct the maintenance of the systems.

The reason why the conventional floating photovoltaic systems as shown in FIGS. 1b and 1c are weak to the rotations like pitch, roll and yaw is that the front row structures and the rear row structures are hinge-connected to each other at the height corresponding to the surface of water. When the floating structures on the surface of water have the rotations like pitch, roll and yaw by means of the external force like wind, the rotations are generated around one point on plane at which the floating structures and the surface of water meet each other.

At this time, a restoring force to an original state from an inclined state is a force applied to the rope, and according to moment characteristics, at this time, if the distance between the center of the rotation and the force applied to the rope becomes long and if the force applied to the rope becomes large, the restoration to the original state becomes fast. In case of the conventional floating photovoltaic systems as shown in FIGS. 1b and 1c, however, since the connection between the front row structures and the rear row structures is made at the height corresponding to the surface of water, the restoration moment is low so that the conventional floating photovoltaic systems are weak to the rotations of the structures.

DISCLOSURE

Technical Problem

Accordingly, the present invention has been made in view of the above-mentioned problems occurring in the prior art, and it is an object of the present invention to provide floating structures for a floating photovoltaic system and a method for connecting the floating structures with each other that are capable of reducing the weight thereof, preventing their breakage by their local load when the bottom of a reservoir is exposed to the outside due to drought or the like, and decreasing the occurrences of their rotations like pitch, roll and yaw.

It is another object of the present invention to provide floating structures for a floating photovoltaic system and a method for connecting the floating structures with each other that are capable of connecting auxiliary float-mounted means to auxiliary floats disposed thereon so that a person who boards the auxiliary float-mounted means moves between the floating structures to easily conduct the maintenance of the floating structures and that are capable of more effectively preventing their movements through the auxiliary float-mounted means.

It is yet another object of the present invention to provide floating structures for a floating photovoltaic system and a method for connecting the floating structures with each other that are capable of providing connection members disposed below the surface of water under the floating structures in such a manner as to be connected to ropes, thereby restraining the displacements and rotations like pitch, roll and yaw of the floating structures and that are capable of providing auxiliary float-mounted means easily moving on water, without being locked onto the ropes connected to the connection members below the surface of water under the floating structures.

Technical Solution

To accomplish the above-mentioned objects, according to a first aspect of the present invention, there are provided floating structures for a floating photovoltaic system fixed to fixing blocks or fixing means fixed to the bottom of water, each floating structure having one or a plurality of solar modules disposed thereon, the floating structures including: a plurality of ropes or a plurality of connection members having fixing hooks for connecting the floating structures with each other so as to restrain the movements of the floating structures; and connecting and fixing parts disposed below the surface of water under the floating structures in such a manner as to be connected to the ropes or the connection members having the fixing hooks, whereby the ropes or the connection members having the fixing hooks are located below the surface of water to restrain the movements of the floating structures.

According to the present invention, desirably, the floating structures further include movement restraint means disposed on the connecting and fixing parts or the connection members to restrain displacements and rotations like pitch, roll and yaw of the floating structures.

To accomplish the above-mentioned objects, according to a second aspect of the present invention, there are provided floating structures for a floating photovoltaic system disposed on the surface of water together with buoys in such a manner as to be fixed to fixing blocks fixed to the bottom of water, each floating structure having a plurality of photovoltaic modules disposed thereon, the floating structures including: a plurality of ropes or fixing hooks for connecting one side end floating structure and the other side end floating structure with the fixing block fixed to the bottom of water to restrain the movements of the floating structures; and movement restraint means disposed under the floating structures to restrain displacements and rotations like pitch, roll and yaw of the floating structures.

According to the present invention, desirably, movement restraint means float the floating structures and restrain the movements of the floating structures by means of the load of water.

According to the present invention, desirably, each movement restraint means includes: wing parts disposed downward from each floating structure in such a manner as to be connected to the floating structure; and frame parts for connecting the wing parts and each floating structure with each other.

According to the present invention, desirably, each wing part has a hook mounted on the end in the opposite direction to each floating structure so that the hooks are connected to each other by means of connection members to connect the plurality of floating structures with each other.

According to the present invention, desirably, the floating structures further include auxiliary float-mounted means disposed on both side ends of the floating structures in such a manner as to be mounted above auxiliary floats of the floating structures.

According to the present invention, desirably, the floating structures further include: brackets located on the tops of the auxiliary floats and having mounting portions for mounting supporting rods thereon; and the supporting rods mounted on the mounting portions of the brackets and connected with the auxiliary float-mounted means.

According to the present invention, desirably, each support has a shape of a pipe and is connected to one side end of the auxiliary float-mounted means or to both side ends of the auxiliary float-mounted means in such a manner as to pass through the interior of the auxiliary float-mounted means, and the mounting portions of the brackets have holes formed thereon to fit the supporting rods thereto.

According to the present invention, desirably, each auxiliary float-mounted means is a boat boarded by a person.

Advantageous Effects

According to the present invention, the floating structures for the floating photovoltaic system and the method for connecting the floating structures with each other can restrain the displacements and rotations of the floating structures, thereby stably maintaining the floating positions of the floating structures on water and sufficiently handling the external forces generated from wind or the stream of water.

According to the present invention, further, the floating structures for the floating photovoltaic system and the method for connecting the floating structures with each other can connect the auxiliary float-mounted means to the auxiliary floats disposed thereon so that a person who boards the auxiliary float-mounted means moves between the floating structures to easily conduct the maintenance of the floating structures and can more effectively prevent their movements through the auxiliary float-mounted means.

According to the present invention, the floating structures for the floating photovoltaic system and the method for connecting the floating structures with each other can provide the connection members disposed below the surface of water under the floating structures in such a manner as to be connected to the ropes, thereby restraining the displacements and rotations like pitch, roll and yaw of the floating structures and can provide the auxiliary float-mounted means easily moving on water, without being locked onto the ropes connected to the connection members below the surface of water under the floating structures.

MODE FOR INVENTION

Objects, characteristics and advantages of the present invention will be more clearly understood from the detailed description as will be described below and the attached drawings. Before the present invention is disclosed and described, however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. In the description, it should be noted that the parts corresponding to those of the drawings are indicated by corresponding reference numerals.

Hereinafter, an explanation on floating structures for a floating photovoltaic system according to the present invention will be in detail given with reference to the attached drawing.

A floating photovoltaic system is configured wherein a plurality of floating structures having a plurality of solar modules disposed thereon is floated on the surface of water together with buoys, while being fixed to fixing blocks fixed to the bottom of water to restrain their displacements and rotations.

Figure 2:
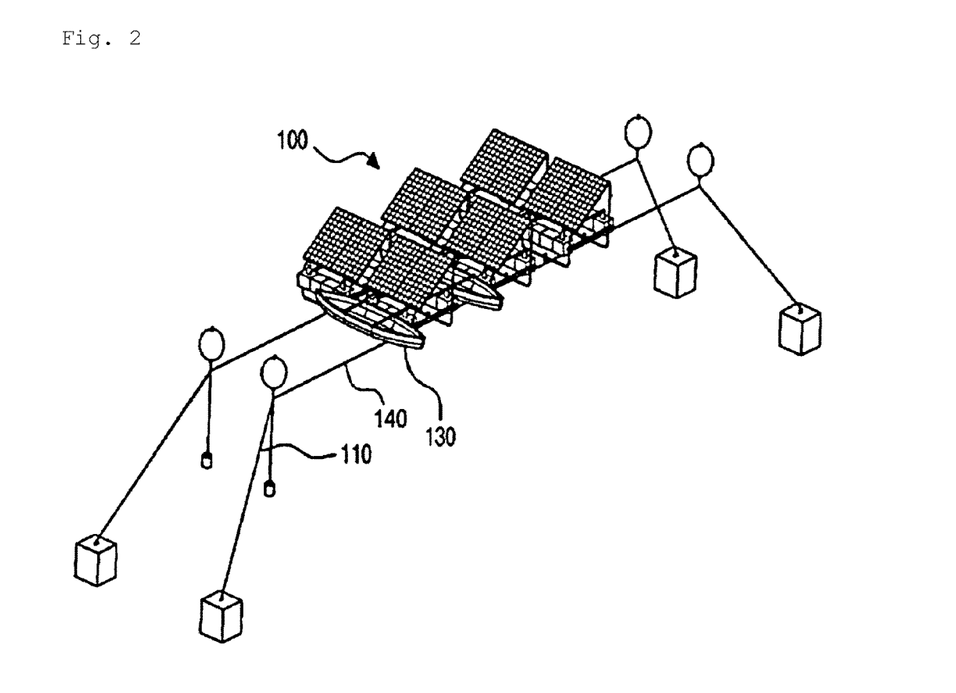
FIG. 2 is a perspective view showing floating structures for a floating photovoltaic system according to the present invention, wherein ropes are connected to connection members.
Figure 3:
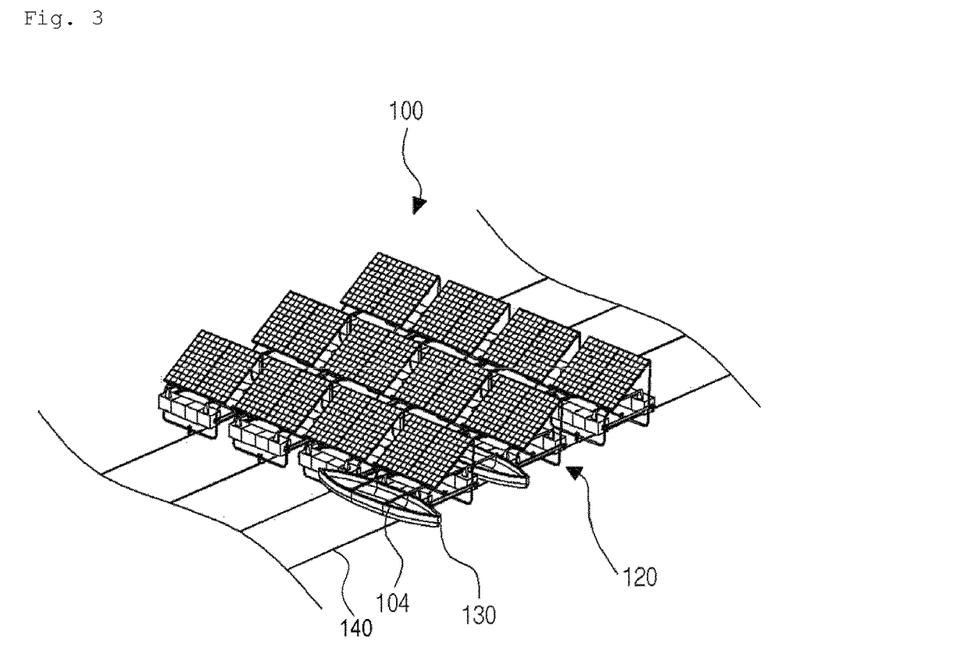
FIG. 3 is a perspective view showing the floating structures for a floating photovoltaic system according to the present invention.
Figure 4:
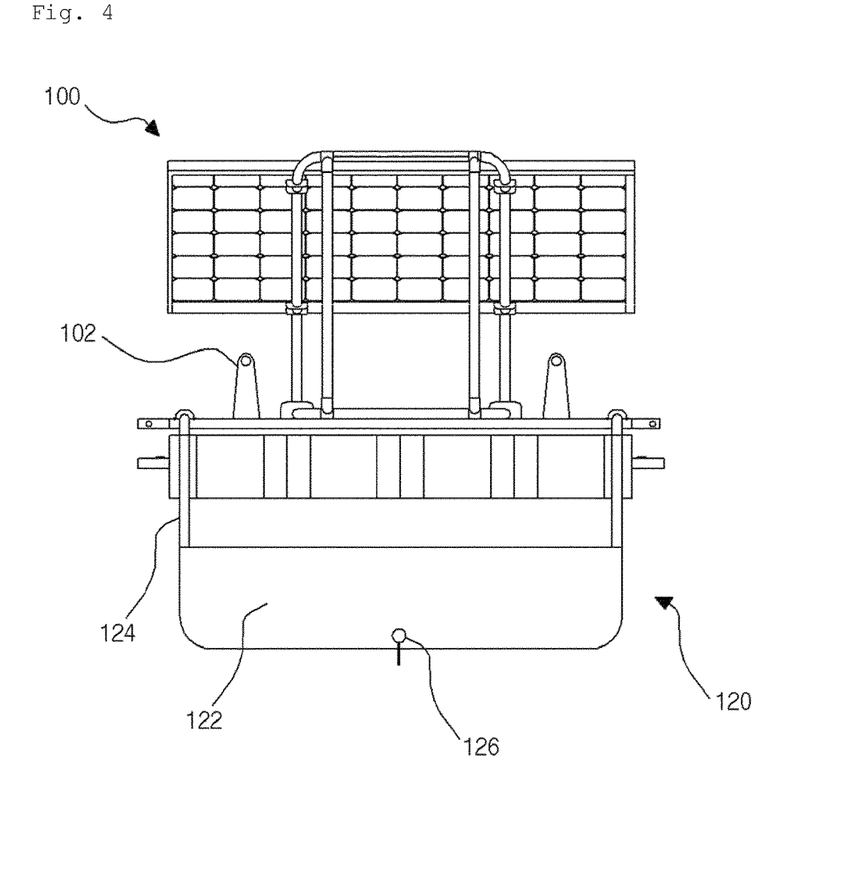
FIG. 4 is a side view showing one floating structure for a floating photovoltaic system according to the present invention.
Figure 5:
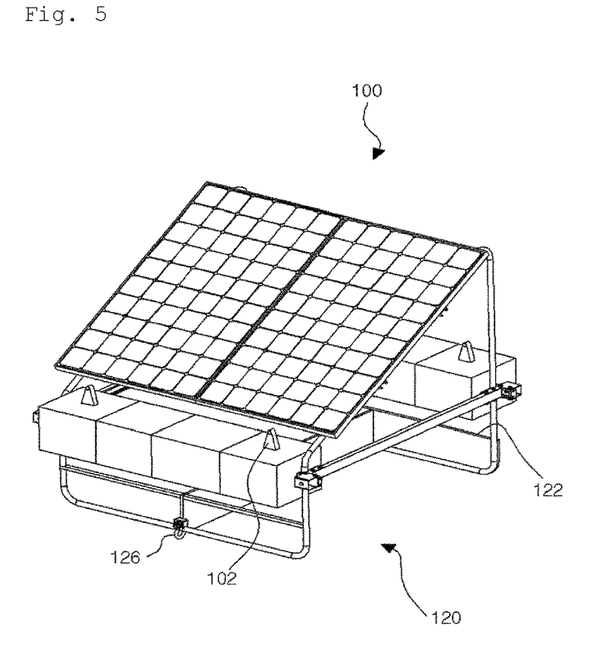
FIG. 5 is a perspective view showing one floating structure for a floating photovoltaic system according to the present invention, wherein wing parts are disposed perpendicular to each other.
Figure 6:
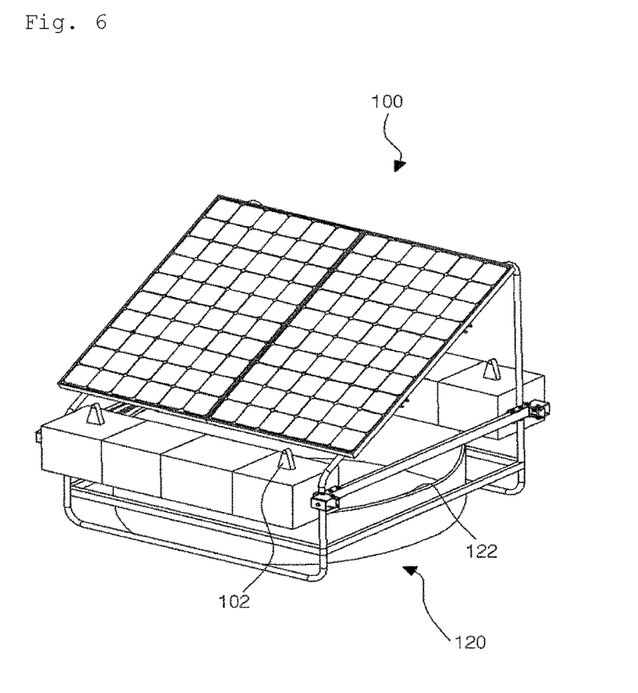
FIG. 6 is a perspective view showing one floating structure for a floating photovoltaic system according to the present invention, wherein a cylindrical wing part is disposed.
Figure 7:
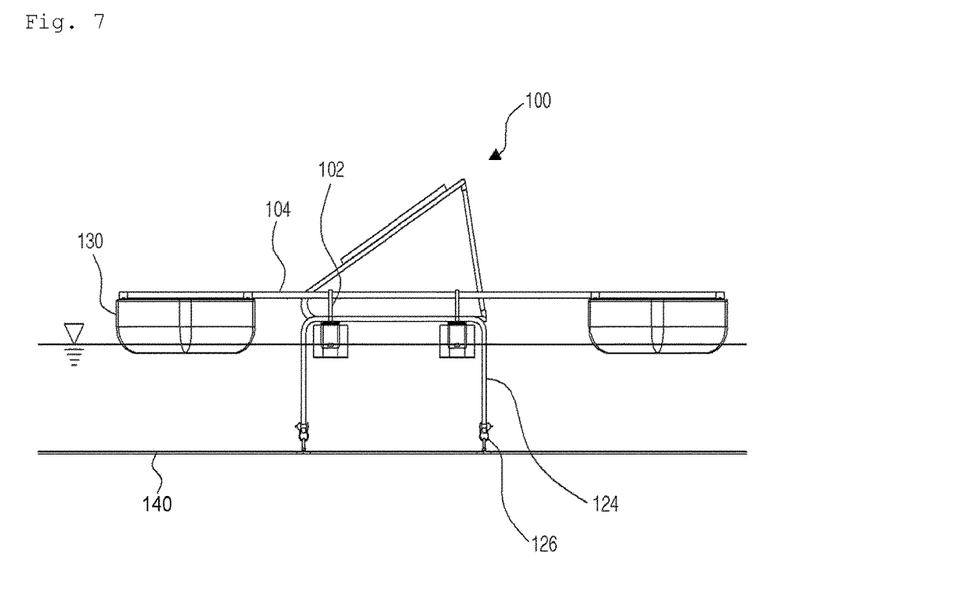
FIG. 7 is a side view showing one floating structure for a floating photovoltaic system according to the present invention, wherein the floating structure is connected to auxiliary float-mounted means.
Figure 8:
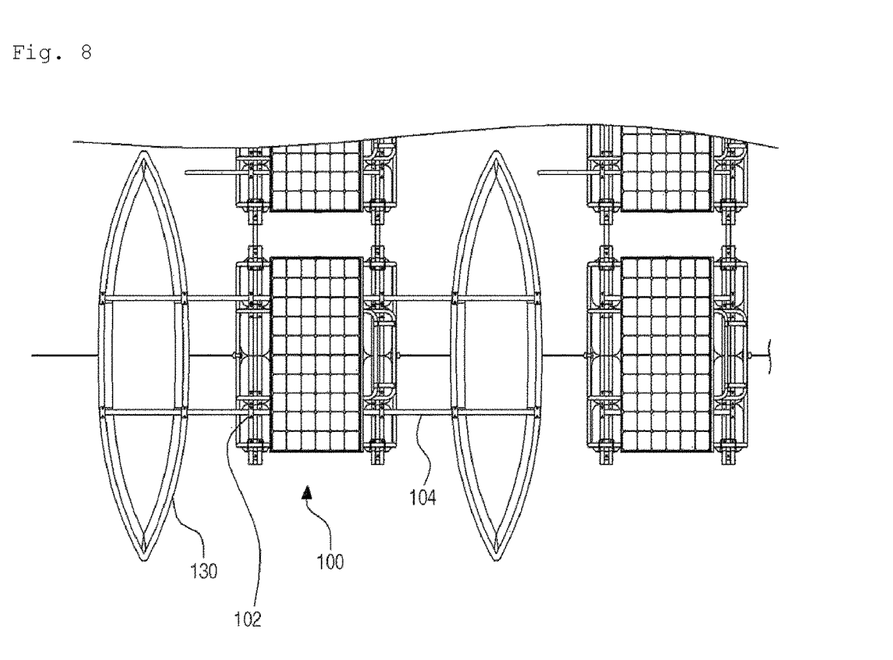
FIG. 8 is a plan view showing one floating structure for a floating photovoltaic system according to the present invention, wherein the floating structure is connected to the auxiliary float-mounted means.

FIG. 2 is a perspective view showing floating structures for a floating photovoltaic system according to the present invention, wherein ropes are connected to connection members FIG. 3 is a perspective view showing the floating structures for a floating photovoltaic system according to the present invention, FIG. 4 is a side view showing one floating structure for a floating photovoltaic system according to the present invention, FIG. 5 is a perspective view showing one floating structure for a floating photovoltaic system according to the present invention, wherein wing parts are disposed perpendicular to each other, FIG. 6 is a perspective view showing one floating structure for a floating photovoltaic system according to the present invention, wherein a cylindrical wing part is disposed, FIG. 7 is a side view showing one floating structure for a floating photovoltaic system according to the present invention, wherein the floating structure is connected to auxiliary float-mounted means, and FIG. 8 is a plan view showing one floating structure for a floating photovoltaic system according to the present invention, wherein the floating structure is connected to the auxiliary float-mounted means.

Referring to FIGS. 2 to 8, floating structures 100 for a floating photovoltaic system according to the present invention includes ropes 110 and connection members 140.

Each rope 110 connects the end of the floating structures 100 and a fixing block (not shown) fixed to the bottom of water with each other so as to restrain the movements of the floating structures 100.

Each connection member 140 is connected to the ropes 110 below the surface of the water under the floating structures 100.

Further, each connection member 140 has a connection fixing part (not shown) to which each rope 110 is fixed and is located below the surface of water in such a manner as to be connected to the ropes 110. Accordingly, the ropes 110 are located below the surface of water to prevent the floating structures 100 from being moved.

Furthermore, each connection member 140 includes movement restraint means 120.

The movement restraint means 120 is adapted to restrain displacements and rotations like pitch, roll and yaw of each floating structure 100.

The movement restraint means 120 is located on the underside of each floating structure 100 to restrain the displacements and rotations of the floating structure 100. That is, the movement restraint means 120 restrains the displacements and rotations of the floating structure 100 by means of the load of water.

The movement restraint means 120 includes wing parts 122 and frame parts 124.

The wing parts 122 are disposed downward from each floating structure 100 in such a manner as to be connected to the floating structure 100. That is, they are completely submerged into the water in such a manner as to receive the load of water to the maximum, while being disposed in vertical directions thereof.

At this time, each wing part 122 is made of a plane plate having a given area and no curvature, and otherwise, it is made of a curved plate having a given curvature.

The wing parts 122 are disposed on both sides of each floating structure 100.

Further, each wing part 122 has a hook 126 mounted on the end in the opposite direction to each floating structure 100. That is, the wing part 122 has the hook 126 disposed on the lower side end thereof.

At this time, the hook 126 from each wing part is connected to each other by means of the connection member 140 so that the plurality of floating structures 100 can be connected. Accordingly, the plurality of floating structures 100 is floatingly connected integrally with each other.

The frame parts 124 connect the wing parts 122 and each floating structure 100 with each other. That is, the frame parts 124 are coupled to both sides of the underside of each floating structure 100 in a downward direction, and the wing parts 122 are coupled between the frame parts 124 and the floating structure 100.

Further, the floating structures 100 for a floating photovoltaic system according to the present invention include a plurality of auxiliary float-mounted means 130.

The auxiliary float-mounted means 130 are disposed on both side ends of one floating structure 100 in such a manner as to be mounted above auxiliary floats. That is, the auxiliary float-mounted means 130 are disposed on the outsides of the auxiliary floats for floating the floating structures 100.

Also, each auxiliary float-mounted means 130 is desirably a boat boarded by a person.

Further, the floating structures 100 for a floating photovoltaic system according to the present invention include brackets 102 and supporting rods 104.

The brackets 102 are located on the tops of the auxiliary floats and have mounting portions for mounting the supporting rods 104 thereon.

Further, the mounting portions of the brackets 102 desirably have holes formed to fit the supporting rods 104 thereto.

The supporting rods 104 are mounted on the mounting portions of the brackets 102 and connected with the auxiliary float-mounted means 130.

In more detail, one end of each supporting rod 104 is fitted to the hole formed on the mounting portion of the bracket 102 and the other end thereof is coupled to the auxiliary float-mounted means 130.

At this time, each supporting rod 104 is connected to one side end of the auxiliary float-mounted means 130 or to both side ends of the auxiliary float-mounted means 130 in such a manner as to pass through the interior of the auxiliary float-mounted means 130.

Each supporting rod 104 desirably has a shape of a pipe light in weight and easily fittable to the hole formed on the mounting portion of the bracket 102.

That is, a manager who boards the auxiliary float-mounted means 130 connected to the supporting rods 104 conducts the maintenance for one floating structure 100, and if he or she wants to move another floating structure 100, he or she draws the supporting rods 104 from the holes of the mounting portions of the brackets 102 so that the auxiliary float-mounted means 130 is movable. At this time, he or she can move to another floating structure 100. Next, the supporting rods 104 are fitted to the holes of the mounting portions of the brackets 102 disposed on the auxiliary float of the floating structure 100 to which the manager moves, and the auxiliary float-mounted means 130 is fixed to the floating structure 100.

Like this, the manager boards the auxiliary float-mounted means 130 and easily moves between the neighboring floating structures 100, thereby conducting the maintenance of the floating structures 100 with ease.

Persons skilled in the relevant art can appreciate that many modifications and variations are possible in light of the above teachings. The foregoing description of the embodiments of the invention has been presented for the purpose of illustration; it is not intended to be exhaustive or to limit the invention to the precise forms disclosed. It is therefore intended that the scope of the invention be limited not by this detailed description, but rather by the claims appended hereto.

The invention claimed is:

1. A floating structure for a floating photovoltaic system fixed to fixing blocks or fixing means fixed to the bottom of water, the floating structure having one or a plurality of solar modules disposed thereon, the floating structure comprising:

a plurality of ropes or a plurality of connection members for connecting the floating structure with each other so as to restrain the movements of the floating structure; and connecting and fixing members disposed below the surface of water under the floating structure in such a manner as to be connected to the ropes or the connection members;

a movement restraint means disposed on the connecting and fixing members or the connection members to restrain displacements and rotations like pitch, roll and yaw of the floating structure, wherein the movement restraint means comprises wing parts disposed downward from the floating structure in such a manner as to be connected to the floating structure, and frame parts for connecting the wing parts and the floating structure with each other, wherein each wing part has a hook mounted on the end in the opposite direction to the floating structure so that the hook from each wing part is connected to each other by means of connection members to connect the floating structure, whereby the ropes or the connection members are located below the surface of water to restrain the movements of the floating structure.

2. The floating structure according to claim 1, further comprising an auxiliary float-mounted means disposed on both side ends of the floating structure in such a manner as to be mounted above auxiliary floats of the floating structure.

3. The floating structure according to claim 2, further comprising: brackets located on the tops of the auxiliary floats and having mounting portions for mounting supporting rods thereon; and the supporting rods mounted on the mounting portions of the brackets and connected with the auxiliary float-mounted means.

4. The floating structure according to claim 3, wherein each support has a shape of a pipe and is connected to one side end of the auxiliary float-mounted means or to both side ends of the auxiliary float-mounted means in such a manner as to pass through the interior of the auxiliary float-mounted means, and the mounting portions of the brackets have holes formed thereon to fit the supporting rods thereto.

5. The floating structure according to claim 2, wherein the auxiliary float-mounted means is a boat.

6. A floating structure for a floating photovoltaic system disposed on the surface of water together with buoys in such a manner as to be fixed to fixing blocks fixed to the bottom of water, the floating structure having a plurality of photovoltaic modules disposed thereon, the floating structure comprising:

a plurality of ropes for connecting one side end floating structure and the other side end floating structure with the fixing block fixed to the bottom of water to restrain the movements of the floating structure; and a movement restraint means disposed under the floating structure to restrain displacements and rotations like pitch, roll and yaw of the floating structure, wherein the movement restraint means float the floating structure and restrain the movements of the floating structure by means of the load of water, wherein the movement restraint means comprises wing parts disposed downward from the floating structure in such a manner as to be connected to the floating structure, and frame parts for connecting the wing parts and each floating structure with each other, wherein each wing part has a hook mounted on the end in the opposite direction to the floating structure so that the hook from each wing part is connected to each other by means of connection members to connect the floating structure.

* * * * *